(12) United States Patent
Allen

(10) Patent No.: US 9,108,671 B2
(45) Date of Patent: Aug. 18, 2015

(54) SEAL ASSEMBLY

(75) Inventor: Todd E. Allen, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 13/563,831

(22) Filed: Aug. 1, 2012

(65) Prior Publication Data

US 2014/0033855 A1 Feb. 6, 2014

(51) Int. Cl.
*F16J 3/00* (2006.01)
*B62D 1/16* (2006.01)
*B60R 13/08* (2006.01)
*F16J 3/04* (2006.01)
*F16J 15/52* (2006.01)

(52) U.S. Cl.
CPC .............. *B62D 1/16* (2013.01); *B60R 13/0853* (2013.01); *F16J 3/042* (2013.01); *F16J 15/52* (2013.01)

(58) Field of Classification Search
USPC .................. 277/634, 635, 636, 391, 392, 315
See application file for complete search history.

(56) References Cited

U.S. PATENT DOCUMENTS

| 2,702,996 | A | * | 3/1955 | Davis | 464/171 |
| 3,747,368 | A | * | 7/1973 | Morin | 464/109 |
| 4,478,137 | A | * | 10/1984 | Clark | 92/63 |
| 4,826,466 | A | * | 5/1989 | Triquet | 464/173 |
| 4,877,258 | A | * | 10/1989 | Alt et al. | 277/636 |
| 4,961,480 | A | * | 10/1990 | Weiler et al. | 188/73.44 |
| 5,419,741 | A | * | 5/1995 | Schwarzler | 464/175 |
| 5,931,738 | A | * | 8/1999 | Robb | 464/140 |
| 6,328,315 | B1 | * | 12/2001 | Hebenstreit | 277/634 |
| 6,764,243 | B1 | * | 7/2004 | Inuzuka et al. | 403/50 |
| 6,796,563 | B2 | * | 9/2004 | Ruebsamen et al. | 277/636 |
| 6,808,207 | B2 | * | 10/2004 | Nakano et al. | 280/806 |
| 6,932,346 | B1 | * | 8/2005 | Hayward | 277/315 |
| 7,281,984 | B2 | * | 10/2007 | Foster-Hamilton et al. | 464/175 |
| 7,296,802 | B2 | * | 11/2007 | Ota | 277/635 |
| 7,753,380 | B2 | * | 7/2010 | Kumazaki et al. | 277/636 |
| 8,469,366 | B2 | * | 6/2013 | Deisinger et al. | 277/634 |
| 8,550,740 | B2 | * | 10/2013 | Brunneke et al. | 403/50 |
| 2008/0237999 | A1 | * | 10/2008 | Mauceri et al. | 277/634 |
| 2008/0246229 | A1 | * | 10/2008 | Ott | 277/634 |
| 2009/0140497 | A1 | * | 6/2009 | Roberts et al. | 277/636 |
| 2010/0230907 | A1 | * | 9/2010 | Hatano et al. | 277/634 |

FOREIGN PATENT DOCUMENTS

| CN | 201092292 Y | 7/2008 |
| DE | 2932317 A1 | 2/1981 |
| DE | 19857389 A1 | 3/2000 |
| DE | 102006053263 A1 | 5/2008 |
| DE | 102010006645 A1 | 8/2011 |
| JP | 11170927 A | 6/1999 |
| JP | 2006076329 A | 3/2006 |
| JP | 2007230279 A | 9/2007 |

* cited by examiner

*Primary Examiner* — Kristina Fulton
*Assistant Examiner* — Eugene G Byrd
(74) *Attorney, Agent, or Firm* — Quinn Law Group, PLLC

(57) ABSTRACT

An apparatus is configured for sealing a hole in a panel having a first surface on one side of the panel and a second surface on the other side of the panel. The apparatus includes a boot and a seal member. The boot includes a first portion having a first bellows, a second portion having a second bellows, and a third portion that interconnects the first portion and the second portion. The seal member is operatively connected to the third portion of the boot and is configured such that, when the third portion of the boot is within the hole, the seal member contacts the panel to form at least one seal around the hole.

14 Claims, 2 Drawing Sheets

SEAL ASSEMBLY

TECHNICAL FIELD

This invention relates to seals that seal holes in panels having shafts extending therethrough.

BACKGROUND

A motor vehicle typically includes a dash panel, or bulkhead, that separates the passenger compartment from an engine compartment. A steering shaft passes through a hole in the dash panel to connect the steering wheel, which is in the passenger compartment, to the steering gear, which is in the engine compartment. A seal is typically employed between the dash panel and the shaft to prevent noise, gases, water, and debris from entering the passenger compartment from the engine compartment via the hole in the dash panel.

SUMMARY

An apparatus is provided for sealing a hole in a panel having a first surface on one side of the panel and a second surface on the other side of the panel. The apparatus includes a boot and a seal member. The boot includes a first portion having a first bellows, a second portion having a second bellows, and a third portion that interconnects the first portion and the second portion. The seal member is operatively connected to the third portion of the boot and is configured such that, when the third portion of the boot is within the hole, the seal member contacts the panel to form at least one seal around the hole.

The seal member provides a seal around the hole, while the boot provides a seal around a shaft that extends through the hole. Installation of the shaft through the boot may require repositioning part of the boot relative to the panel. The apparatus provided herein facilitates the installation of the shaft because the bellows decouple the seal member from loads generated by movement of the boot during shaft installation, thereby maintaining the position of the seal member relative to the panel and thus increasing the efficacy of the seal member.

The above features and advantages and other features and advantages of the present invention are readily apparent from the following detailed description of the best modes for carrying out the invention when taken in connection with the accompanying drawings.

DETAILED DESCRIPTION

Figure 1:
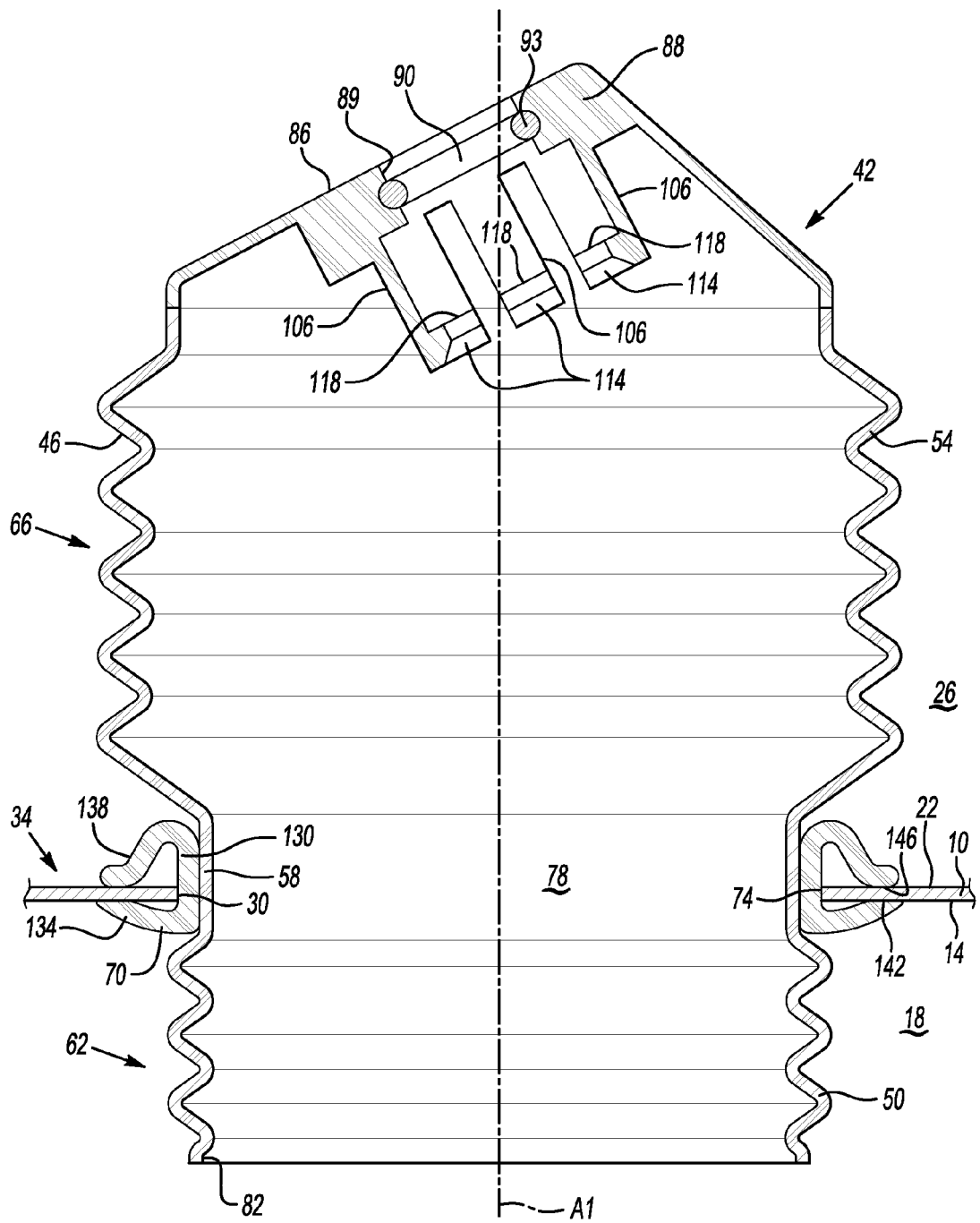
FIG. 1 is a schematic, sectional, side view of a seal apparatus in an unstressed state.

Referring to FIG. 1, a panel 10 has a first surface 14 on a first side 18 and a second surface 22 on a second side 26. The panel 10 defines a circular hole 30 that extends through the panel 10 from the first surface 14 to the second surface 22. In the embodiment depicted, the panel 10 is part of a motor vehicle 34, and separates an engine compartment (on the first side 18) and a passenger compartment (on the second side 26). The hole 30 is to accommodate a steering shaft (shown at 38 in FIG. 2) extending from the engine compartment to the passenger compartment. A seal apparatus 42 is configured to seal the hole 30 and thereby prevent or limit the transmission of noise, debris, and water through the hole 30, while allowing the steering shaft 38 to pass therethrough.

The seal apparatus 42 includes a boot 46 having a first portion 50, a second portion 54, and a third portion 58. The first portion 50 includes a first bellows 62. The second portion 54 includes a second bellows 66. The third portion 58 extends through the hole 30 and interconnects the first portion 50 and the second portion 54.

The seal apparatus 42 also includes a seal member 70, which is operatively connected to the third portion 58 of the boot 46. The seal member 70 is configured such that, when the third portion 58 of the boot 46 is disposed within the hole 30, the seal member 70 contacts the panel 10 to form at least one seal 74 around the hole 30.

The boot 46 is generally cylindrical, although other shapes may be employed within the scope of the claimed invention. For example, the boot 46 may be conical or frusto-conical. The boot 46 is shown in FIG. 1 in an unstressed state. In the unstressed state, the bellows 62, 66 are axisymmetric, i.e., symmetric about axis A1.

The boot 46 defines a chamber 78. The first portion 50 of the boot 46 defines a first opening 82 of the chamber 78 on the first side 18 of the panel 10. The boot 46 includes a bearing 86 that is operatively connected to the second portion 54 of the boot 46. The bearing 86 defines a second opening 90 of the chamber 78 on the second side 26 of the panel 10. More specifically, in the embodiment depicted, the bearing 86 includes a plastic support member 88 defining a hole or cylindrical aperture 89. A low-friction O-ring or bushing 93 is mounted to the plastic support member 88 inside a groove around the aperture 89 and defines the second opening 90.

Figure 2:
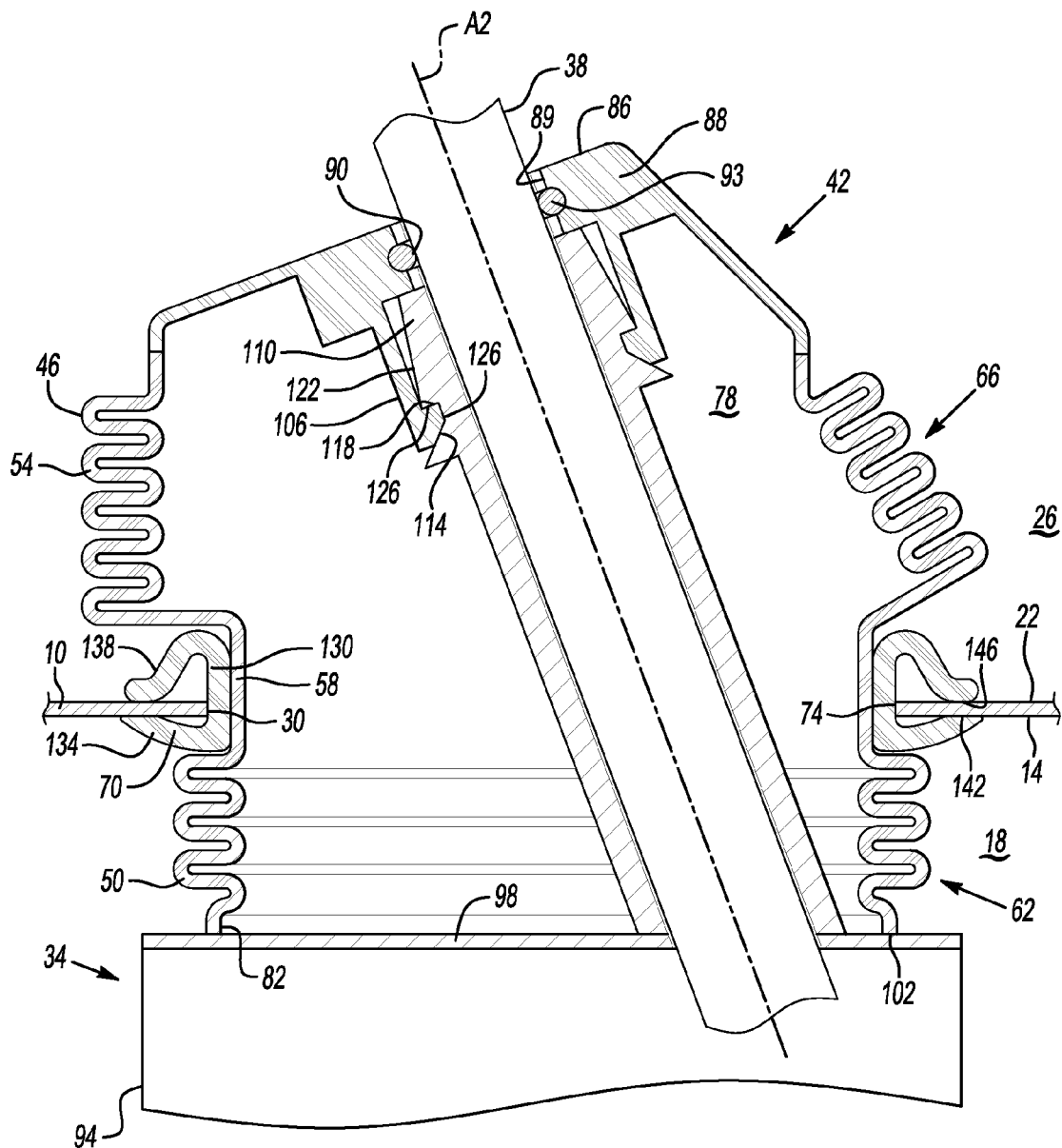
FIG. 2 is a schematic, sectional, side view of the seal apparatus of FIG. 1 with a steering shaft extending therethough.

The steering shaft is extendable through the first and second openings 82, 90 and the chamber 78, as shown in FIG. 2. FIG. 2 depicts the seal apparatus 42 with the steering shaft 38 extending through the first and second openings 82, 90. Referring to FIG. 2, wherein like reference numbers refer to like components from FIG. 1, the vehicle 34 includes a steering gear assembly 94 that is operatively connected to the steering shaft 38 and that includes a housing 98.

To engage the steering shaft 38 with the seal apparatus 42, the steering shaft 38 is inserted from the engine compartment (on the first side 18 of the panel 10) through the first opening 82, and into the chamber 78. The steering gear assembly 94 moves with the steering shaft 38, and the housing 98 contacts the first portion 50 of the boot 46. As the steering shaft 38 moves further into the chamber 78, the housing 98 compresses the first bellows 62, and the first portion 50 forms a seal 102 against the housing 98. The first bellows 62 decouples the seal member 70 from loads transmitted from the housing 98 to the seal apparatus 42 during this process; accordingly, the mating of the housing 98 to the seal apparatus 42 will not significantly affect the seal 74 formed between the seal member 70 and the panel 10.

The bearing 86 must be moved relative to the panel 10 and the steering shaft 38 in order to be sufficiently aligned with the steering shaft 38 to allow the steering shaft 38 to extend through the second opening 90. The second bellows 66 enables movement of the bearing 86 relative to the panel 10 without significant transmission of any resultant loads to the seal member 70. Accordingly, the bearing 86 is movable without affecting the seal 74 formed between the seal member 70 and the panel 10.

As shown in FIG. 2, movement of the bearing 86 causes stress on the second bellows 66, with resultant elastic material strain in the second portion 54 of the boot 46. In order to maintain the position of the bearing 86 relative to the shaft 38, a first fastening element 106 is mounted with respect to the bearing 86. A second fastening element 110 is mounted with respect to the steering gear assembly 94. The first fastening element 106 is engaged with the second fastening element 110 once the steering shaft 38 extends sufficiently through the second opening 90; accordingly, the first and second fastening elements 106, 110 restrict movement of the bearing 86 and the second portion 54 of the boot 46 relative to the steering shaft 38 and maintains the elastic strain in the bellows 66.

The first and second fastening elements 106, 110 are configured to provide a snap-fit engagement with one another when the steering shaft 38 is sufficiently inserted through the second opening 90. More specifically, in the embodiment depicted, the first fastening element 106 is a hook having a surface 114 that is oriented approximately 45 degrees from the axis A2 of the shaft 38. The hook also includes a surface 118 that is perpendicular to the axis A2. The second fastening element 110 is a member that includes inclined surface 122 and surface 126, which is perpendicular to the axis A2.

As the steering shaft 38 is axially moved through the opening 90 in bearing 86, inclined surface 122 of the second fastening element 110 contacts surface 114 of the first fastening element, which results in a force having a radial component that elastically bends the first fastening element 106 radially outward. As the shaft 38 is further inserted through the opening 90, surface 122 and surface 114 lose contact, and the first fastening element 106 moves radially inward with the removal of the stress caused by the force from the second fastening element 110. Surface 126 and surface 118 are in contact with one another and thereby prevent axial movement of the bearing 86 relative to the shaft 38. As shown in FIG. 1, the apparatus 42 includes a plurality of hook-like fastening elements 106 that are arranged in a circle to interact with other fastening elements like the one shown at 110.

The shaft 38 is rotatable about axis A2 relative to the fastening elements 106, 110 and the bearing 86. The bushing 93 sealingly contacts the shaft 38. Accordingly, both openings 82, 90 to the chamber 78 are sealed. Openings 82, 90 are the only openings to the chamber 78.

In the embodiment depicted, the first portion 50 of the boot 46 has a higher spring constant than the second portion 54 of the boot 46, and may be blow-molded polyethylene. The seal member 70 may, for example, be a compliant rubber. The seal member 70 in the embodiment depicted includes a first part 130 that contacts the panel 10 inside the hole 30, a second part 134 that contacts the first surface 14 of the panel 10, and a third part 138 that contacts the second surface 22 of the panel 10. The contact between the first part 130 of the seal member 70 and the panel 10 forms a first annular face seal 74. The contact between the second part 134 of the seal member 70 and the first surface 14 forms a second annular face seal 142. The contact between the third part 138 of the seal member 70 and the second surface 22 forms a third annular face seal 146.

It should be noted that the boot 46 and seal member 70 may be a single piece or may comprise multiple connected pieces within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
   a panel having a first surface on a first side and a second surface on a second side and defining a hole that extends through the panel from the first surface to the second surface;
   a boot including a first portion having a first bellows, a second portion having a second bellows, and a third portion that extends through the hole and that interconnects the first portion and the second portion;
   wherein the boot defines a chamber;
   wherein the first portion of the boot defines a first opening of the chamber on the first side of the panel; and
   wherein the boot includes a bearing that is operatively connected to the second portion of the boot and that defines a second opening of the chamber on the second side of the panel;
   a first fastening element operatively attached to the bearing and disposed within the chamber;
   wherein the first fastening element is selectively engageable to a second fastening element; and
   a seal member operatively connected to the third portion of the boot, and contacting the panel to form at least one seal around the hole;
   wherein the second fastening element is mounted with respect to a steering shaft extending through the first and second openings such that the second fastening element is disposed within the chamber and is rotatable relative to the steering shaft.

2. The apparatus of claim 1, further comprising a steering gear assembly operatively connected to the steering shaft and including a housing;
   wherein the housing contacts the first portion of the boot and compresses the first bellows against the panel.

3. The apparatus of claim 2, wherein the second portion of the boot is characterized by elastic strain.

4. The apparatus of claim 3,
   wherein the first fastening element is engaged with the second fastening element and thereby restricts movement of the second portion of the boot relative to the steering shaft and maintains the elastic strain.

5. The apparatus of claim 4, wherein the first and second fastening elements are configured to provide a snap-fit engagement with one another when the steering shaft is sufficiently inserted through the second opening.

6. The apparatus of claim 2, wherein the first portion of the boot has a higher spring constant than the second portion of the boot.

7. The apparatus of claim 1, wherein the hole is circular;
   wherein the seal member includes a first part that contacts the panel inside the hole, a second part that contacts the first surface of the panel, and a third part that contacts the second surface of the panel;
   wherein the at least one seal around the hole includes a first annular face seal, a second annular face seal, and a third annular face seal;
   wherein the contact between the first part of the seal member and the panel forms the first annular face seal;
   wherein the contact between the second part of the seal member and the first surface forms the second annular face seal; and
   wherein the contact between the third part of the seal member and the second surface forms the third annular face seal.

8. An apparatus for sealing a hole in a panel having a first surface on one a first side of the panel and a second surface on a second side of the panel, the apparatus comprising:

a boot including a first portion having a first bellows, a second portion having a second bellows, and a third portion that interconnects the first portion and the second portion;

wherein the first portion of the boot defines a first opening of the boot on the first side of the panel; and wherein the boot includes a bearing that is operatively connected to the second portion of the boot and that defines a second opening of the boot on the second side of the panel;

a first fastening element operatively attached to the bearing;

wherein the first fastening element is selectively engageable to a second fastening element; and a seal member configured such that, when the third portion of the boot is within the hole, the seal member is disposed between the third portion of the boot and the panel to form at least one seal around the hole;

wherein the second fastening element is mounted with respect to a shaft extending through the first and second openings such that the second fastening element is rotatable relative to the shaft.

9. The apparatus of claim 8, wherein the boot defines a chamber;

wherein the first portion of the boot defines a first opening of the chamber; and wherein the boot includes a bearing that is operatively connected to the second portion of the boot and that defines a second opening of the chamber.

10. The apparatus of claim 8, wherein the first portion of the boot has a higher spring constant than the second portion of the boot.

11. The apparatus of claim 8, wherein the first bellows and the second bellows are axisymmetric when the boot is unstressed.

12. The apparatus of claim 8, wherein the seal member includes a first part, a second part, and a third part;

wherein the at least one seal includes a first seal, a second seal, and a third seal; and wherein the seal is configured such that, when the third portion of the boot is within the hole, the first part of the seal contacts the panel inside the hole to form the first seal, the second part of the seal contacts the first surface of the panel to form the second seal, and the third part of the seal contacts the second surface to form the third seal.

13. The apparatus of claim 8, wherein:

the seal element is made of a compliant material;

the boot is made of a moldable material; and the compliant material and the moldable material are different materials.

14. The apparatus of claim 1, further comprising a bushing mounted to the bearing;

wherein the bushing defines the second opening.

* * * * *